United States Patent Office 3,065,044
Patented Nov. 20, 1962

3,065,044
RECOVERY OF ALUMINUM FROM FISSION PRODUCTS
Raymond E. Blanco and Irwin R. Higgins, Oak Ridge, Tenn., assignors to the United States of America as represented by the United States Atomic Energy Commission
No Drawing. Filed May 6, 1954, Ser. No. 428,148
12 Claims. (Cl. 23—14.5)

Our invention relates to a process for the recovery of aluminum from extraneous impurities and more particularly to a process for the recovery and decontamination of aluminum from fission products.

Aluminum is widely employed for various radiochemical purposes. Thus, aluminum is employed as a jacketing material for neutronic bombardment targets; uranium-aluminum alloys find considerable use as fuel elements; and aluminum nitrate is employed as a salting agent in solvent extraction processes for the recovery of uranium (see, for example, co-pending aplication S.N. 178,266, filed August 8, 1952, now Patent No. 2,859,091, issued November 4, 1958, in the name of Charles E. Winters. Heretofore, radioactively-contaminated aluminum nitrate wastes from such processes have been disposed of by burial together with other radioactive liquid wastes. This has resulted in considerable economic loss, for if the bulk of the inactive aluminum salts could be decontaminated of fission products, the aluminum might be reused as a salting agent or for a multiplicity of other purposes. The resulting radioactive waste solution might then be used as a source of valuable isotopes or evaporated to much smaller volume for more economical storage.

One method that was investigated for the recovery and decontamination of radioactively-contaminated aluminum involved the precipitation of aluminum from aqueous solution as the hydroxide. The precipitate was very difficult to filter or centrifuge, and the bulk of the hydroxide was found to be almost as large as that of the initial aluminum nitrate solution, thereby not substantially diminishing bulk storage requirements. The volume of the precipitate thus obtained may be reduced by employing a homogeneous neutralization method in which the pH of the solution is slowly raised by the decomposition of urea. However, very poor decontamination is obtained by this procedure.

Another method involved the separation of aluminum as aluminum sulfate by crystallization from an aqueous ethyl alcohol solution. Gross gamma decontamination factors up to 20 were obtained. Individual decontamination factors for ruthenium, zirconium and niobium ranged from 20 to 200, while those for cesium, strontium, and rare earths were in the range of from 5 to 40. An important objection to the large scale employment of this process, however, was the large amounts of sulfuric acid required, which materially increased storage volumes.

An object of our invention, therefore, is to provide an improved process for the recovery of aluminum from extraneous impurities.

Another object is to provide a process for the recovery and decontamination of radioactively-contaminated aluminum.

Another object is to provide a relatively rapid process, for the recovery of aluminum in high yield and purity from an aqueous solution of uranium fission products and for the simultaneous reduction of the volume of the resulting solution.

Still another object is to provide a process for the recovery and decontamination of aluminum from an acidic aqueous solution containing same as aluminum nitrate together with fission products and plutonium and for the simultaneous obtainment of a concentrated source of radioactivity.

Other objects and advantages of our invention will be apparent to those skilled in the art from the following description and the claims appended hereto.

In accordance with our invention, aluminum may be recovered from an acidic aqueous solution containing same and extraneous impurities by contacting said solution with a comminuted hydrous metal oxide, separating the resulting aluminum-containing supernatant solution from the resulting impurities-containing metal oxide precipitate, contacting the separated supernatant solution with a comminuted cation exchange resin, separating the resulting supernatant solution from the resulting aluminum-containing resin, and selectively eluting and collecting said aluminum from the separated resin.

The practice of our invention achieves a relatively rapid recovery of aluminum in extremely high yield and purity and a startling reduction in the volumes of the resulting radioactive waste solutions. Thus, employing our process, we consistently obtain aluminum recoveries ranging from 97%–99%, and when the aluminum is radioactively contaminated wtih uranium fission products, beta and gamma decontamination factors of $10^3$–$10^4$. We also obtain volume reduction factors of from 33 to 100, which permits use of the highly concentrated bulk of fission products as a small point source for radiation purposes.

Certain fission products, especially strong gamma activity zirconium, niobium, and ruthenium, are extremely difficult to separate from aluminum and cause such erratic and unreproducible results as to make a single step aluminum decontamination by ion-exchange virtually impossible. We unexpectedly find that these troublesome fission products may be almost quantitatively separated from aluminum by a scavenging precipitation prior to the ion-exchange step. We further find that the absence of these fission products from the resin bed greatly improves the manageability of our overall process, and immensely enhances the aluminum yield and decontamination far beyond the additive results one might expect from the mere removal of a given quantity of radioactivity. While we are not certain as to what our improved results may be ascribed, we hypothesize that, if not removed by a scavenging precipitation, the above-named and other fission products tend to assume colloidal configurations, conglomerate in the resin bed, and therefore interfere with all phases of the ion-exchange procedure. The precipitate obtained in the scavenging may be used, then, in biological experiments or for other radiation purposes, particularly where a high gamma activity source is required.

Although many reagents may scavenge under acidic conditions to yield some aluminum decontamination, only hydrous metal oxides are very satisfactory. Examples of such oxides include silicon dioxides, manganese dioxide, titanium dioxide, niobium oxide, ferric oxide and a number of rare earth oxides, particularly cerium oxide. We find, however, that unexpectedly superior results may be attained by the utilization of a combination of $Fe_2O_3$ and $MnO_2$, the action of one complementing and enhancing the action of the other. Even further improvement in scavenging efficiency may be had by using the two reagents in a fixed sequence, that is, by adding the $Fe_2O_3$ before the $MnO_2$. While not substantiated, it is hypothesized that the $Fe_2O_3$ is the principal radioactivity adsorber while the $MnO_2$ assists significantly in carrying the $Fe_2O_3$ out of solution.

Although the amount of iron and manganese scavengers added to the solution may vary over a wide range with satisfactory results, it is, of course, desirable to use as little as is consistent with efficient scavenging, in order to keep added solids to a minimum. Therefore, from approximately 0.007% to approximately 0.07%, by total weight of the solution, of iron and of manganese is satisfactory, while approximately 0.01% of each is preferred. Increasing the amounts of the iron and manganese from 0.01% to 0.1% by weight may make no essential difference in decontamination efficiency, but unnecessarily adds solids to the solution.

Ferric oxide and manganese dioxide may be directly added to the solution preformed or may be formed within the solution, the latter method being preferred. Although any relatively soluble ferric and manganous salt, such as $FeCl_3$, $Fe_2(SO_4)_3$, $MnCl_2 \cdot nH_2O$ (all common manganese salts are bivalent and the soluble ones are always hydrated, the degree of hydration depending on the temperature of crystallization) may be satisfactorily employed, we prefer to utilize the nitrates due to their high solubility and also because aluminum is generally present as the nitrate when it is employed as a salting agent in uranium solvent extraction processes. In one method of forming $MnO_2$ and $Fe_2O_3$ in solution, ferric nitrate is added, and the mixture boiled until red colloidal hydrous ferric oxide is formed, which takes approximately one minute. Manganous nitrate $[Mn(NO_3)_2 \cdot 6H_2O]$ may then be added to the resulting solution and insoluble manganese dioxide formed by the slow addition of an oxidizing agent such as $H_2O_2$, $CrO_4^-$ or $MnO_4^-$ to the boiling solution. Permanganate is preferred (as an alkali salt such as $KMnO_4$), for in oxidizing $Mn^{+2}$ to insoluble $MnO_2$, it is, itself, reduced to insoluble $MnO_2$.

The molarity of the waste solution in aluminum in the scavenging precipitation may vary considerably while yet achieving efficient removal of radiocolloids. However, the efficiency of carrying generally varies inversely with bulk ionic strength. Hence, a concentration of the waste solution of approximately 0.25 M–1.0 M is satisfactory while approximately 0.5 M is preferred. An unexpected additional benefit from proceeding with relatively dilute solutions is that an undesirable tendency of manganese dioxide to become colloidal rather than precipitate is greatly retarded.

Scavenging precipitation may be satisfactorily carried out over a wide range of acidic conditions. We find, however, that scavenging may be particularly effectively conducted within the acidic pH range. Thus, a pH of approximately 1–4 is very satisfactory, while a pH of approximately 2 is preferred. An incidental advantage in scavenging at an acidic pH derives from aluminum nitrate waste solutions of uranium solvent extraction processes being within the acidic pH range. Hence, gross acidity adjustments need not be made for these solutions prior to scavenging.

A wide variety of cation exchange resins may be satisfactorily utilized in our invention. However, advantageous results may be obtained with a relatively inert organic resin containing free sulfonic acid groups, that is, resins which contain numerous R—$SO_3$—R′ groups in which R is an organic group such as a methylene group and in which R′ is hydrogen or a metal cation, alkali metal ions, particularly Na+, being preferred. Particularly satisfactory resins which may be employed are sulfonated phenolic resins, while sulfonated polystyrene resins are preferred due to their large exchange capacity, resistance to physical breakdown under nuclear irradiation and chemical stability to eluting reagents. Both these resin types contain a plurality of methylene sulfonic acid groups (—$CH_2SO_3H$), and in the adsorption process the hydrogen or sodium of the sulphonic acid group is replaced by a cation of the substance to be adsorbed, which thereupon forms a more or less loosely associated molecule with the resin. Representative sulfonated phenolic resins are the Dow Chemical Co. resin sold under the trade name of Dowex-30, Rohm and Haas IR–100, and Ionics, Inc. CR–51, while an excellent representative sulfonated polystyrene resin, which we prefer to employ, is the Dow Chemical Co. resin Dowex-50.

The above resins may be satisfactorily employed in a wide variety of particle sizes. The use of smaller resin particles results in more rapid attainment of equilibrium during adsorption and of sharper bands during elution, thereby permitting faster flow rates. However, extremely small resin particles produce a high resistance to the flow of liquid in a column and a compromise must be made between resin size and the hydrostatic head needed to maintain an efficient but economic flow rate. A satisfactory compromise between hydraulic and diffusion efficiencies may be obtained with the employment of a resin of mesh size of approximately 50–200, while a mesh size of approximately 80–100 is preferred.

The aluminum-containing supernatant solution obtained in the scavenging precipitation, which is preferably approximately 0.5 M in aluminum, may be satisfactorily passed through the cation exchange resin bed without any concentration adjustment, or without the addition of complexing reagents. However, we find that improvements in the aluminum product yield and purity may be unpredictably obtained by diluting the feed solution from approximately 0.5 M to approximately 0.05 M–0.2 M, approximately 0.1 M being preferred, before passage through the resin bed. Apparently, the use of a relatively more dilute feed solution permits the adsorption of the remaining unscavenged fission products at a relatively higher point on the resin bed than the aluminum and permits the maximum separation from aluminum in the subsequent elution.

Furthermore, we find that the use of a sufficiently dilute complexing agent in the feed solution binds a significant quantity of the fission products in complex molecules and prevents their adsorption on the resin bed while not affecting aluminum adsorption, thereby further expediting the ion exchange operation and increasing the purity of the aluminum product in the subsequent elutriant. A number of satisfactory complexing agents are available, such as, for example, aqueous fluorides and citrates. However, significantly superior results may be obtained with the employment of proper concentrations of aqueous oxalic acid, which is particularly effective in complexing any troublesome zirconium and niobium not completely removed by the scavenging. Great caution must be exercised in the employment of oxalic acid, though, to prevent complexing of aluminum and for this purpose, the use of very dilute oxalic acid is called for. Thus, a satisfactory concentration of oxalic acid in the feed solution is from approximately 0.008 M to approximately 0.04 M, while approximately 0.016 M is preferred.

Our process is sufficiently versatile to permit widely varying flow rates in the adsorption and elution steps while yet achieving maximum recovery and decontamination of aluminum. However, we find that a flow rate of approximately 1 ml./min./cm.$^2$ to approximately 10.0 ml./min./cm.$^2$ is satisfactory, while a flow rate of approximately 4 ml./min./cm.$^2$ is preferred.

A great number of acidic and basic reagents, in view of the amphoteric nature of aluminum, may be used to elute the adsorbed aluminum. Examples of elutriants that may be used in our invention include aqueous solutions of NaOH, inorganic halides such as ammonium fluoride and hydrofluoric acid, 0.3 N nitric and 0.3 N sulfuric acids, and aqueous organic polycarboxylic acids, such as citric and tartaric, and the alkali and ammonium salts thereof. These elutriants, however, fail to meet some of the many and exacting requirements for a completely suitable elutriant. Among these requirements are that the elutriant should be decomposable, to prevent the addition of extra bulk to the wastes. Desirably, the developing action of the elutriant should be relatively rapid, so as to subject the resin to a minimum of irradiation from adsorbed fission products. Furthermore, the elutriant should complex the aluminum strongly in order to achieve a high product yield in a relatively small volume of elutriant. We find that only oxalic acid, another polycarboxylic acid, at the proper concentration, unexpectedly meets all these requirements. Advantages of aqueous oxalic acid that are not possessed to the same high degree by other elutriaants include the need for only a relatively small volume of oxalic acid because of the strong aluminum oxalate complex which is formed. Probably the greatest single advantage in the use of oxalic acid as the elutriant is that the aluminum decontamination obtained is surprisingly nearly 100 times greater than that obtained with any other elutriant, even other polycarboxylic acids. Finally, and of great significance, oxalates may be decomposed to carbon dioxide and water by boiling with nitric acid, and hence no additional solids are added to the waste solution.

Although the concentration of the aqueous oxalic acid elutriant may satisfactorily vary over a fairly wide range, we find that a concentration of from approximately 0.1 M to approximately 1 M is particularly satisfactory, while we prefer to employ a concentration of approximately 0.4 M. It is noted that oxalic acid at this concentration strongly complexes and desorbs Al, while leaving unaffected the fission products adsorbed on the resin, whereas the relatively more dilute oxalic acid added earlier to the feed solution (0.016 M) appears to selectively complex only certain fission products, such as niobium and zirconium. Similarly, the pH of the oxalic acid solution may satisfactorily vary considerably, but it is preferred to employ aqueous oxalic acid at its "natural" or unadjusted pH. Thus, for example, aqueous 0.4 M oxalic acid has a natural pH of 0.78.

After the removal of the aluminum from the column, the eluate may be evaporated to dryness and excess oxalic acid recovered from this residue by sublimation. The aluminum oxalate may then be decomposed to aluminum nitrate with fuming aqueous nitric acid solution. The fission products, including cesium, which remain on the resin bed after the selective removal of the aluminum, may be removed with a stronger aqueous mineral acid than is employed for aluminum elution, such as, for example, approximately 6 N nitric acid. The resulting eluate may then be evaporated to a minimum volume and stored, or used for the recovery of individual fission products, or as a small point source for radiation purposes. By the removal of the fission products with the aqueous mineral acid the resin is regenerated and ready for re-use after washing with water.

In certain situations, radioactively-contaminated aluminum wastes may be contaminated with small amounts of plutonium together with fission products. This may be expected principally where aluminum nitrate is employed in the solvent extraction processing of neutron-irradiated normal uranium, in which the Pu-content may be expected to be higher than in non Pu-producing U–235-enriched uranium. While our process achieves separation of aluminum from plutonium, when present, it may be desired to separately recover this highly valuable fissionable material, particularly when the aluminum is not destined for direct re-use in uranium solvent extraction processes (where such re-use is planned, the removal of trace amounts of Pu is of course not necessary).

Fractional carrier precipitation and solvent extraction methods are available for plutonium recovery. However, we find that the following method may be uniquely readily integrated into our overall process between the scavenging precipitation and the ion-exchange operations. Briefly, the supernatant solution recovered from the scavenging step may be further acidified, the plutonium then reduced from a valence state of $+6$ and $+4$ to $+3$, and the resulting solution passed through an intermediate ion-exchange column similar to, but of smaller capacity than, the column previously described for aluminum purification. The $Pu^{+3}$ is held strongly on the column, while the aluminum, after saturating the resin, passes (or "breaks") through the column with other fission products. The resulting filtrate may then be subjected to the ion-exchange steps for aluminum recovery referred to in the foregoing.

We find that the acidity at which the plutonium is reduced appears to be exceedingly critical. Thus, at a pH of 2.0–2.5, which is within the acidity range of the scavenging operation, decontamination factors of from only 15–20 may be obtained, while at higher acidities, decontamination factors ranging up to 5,000 are possible in soltuions of the same Pu concentration. Thus, an acidity of approximately 0.05 M–0.2 M in $HNO_3$ is satisfactory, while an acidity of approximately 0.1 M in $HNO_3$ is preferred. The utilization of higher acidities apparently decreases the tendency of plutonium to become polymerized or colloidal, and thus lost to recovery by ion-exchange means.

A variety of reducing agents, both organic and inorganic, may be employed for reducing plutonium to a valence state of $+3$, and the employment of a particular one is not highly critical. Nonetheless, we find that hydrazine, ferrous sulfamate and various relatively low molecular weight aliphatic organic ketones and aldehydes, such as formaldehyde, are particularly suitable, while hydroxylamine is preferred. The concentration of the reducing reagent may satisfactorily range from approximately 0.05 M to approximately 0.2 M while approximately 0.1 M is preferred.

In more detail, plutonium may be recovered from the supernatant solution of the scavenging step by adjusting the concentration of said solution to approximately 0.1 M in $NHO_3$ and approximately 0.1 M in hydroxylamine, and permitting the resulting solution to stand until the Pu is reduced to $Pu^{+3}$ (about 12–24 hours is generally required for this reduction). The resulting solution is then diluted to approximately 0.1 M aluminum by the addition of water and passed through a Dowex-50 resin column at a flow rate of approximately 1–10 ml./m./cm.$^2$. The plutonium is adsorbed on the resin and the aluminum, after saturating the resin, breaks through. Passage of the solution over the resin is continued until an alpha count is detected in the filtrate, indicating Pu break through. The aluminum-containing filtrate from the resin bed may then be made approximately 0.01 M in oxalic acid and further processed for aluminum decontamination in accordance with our invention. The plutonium may then be recovered and the resin bed reactivated by washing with an aqueous mineral acid, such as aqueous $HNO_3$.

In a preferred form of our invention, aluminum may be recovered from an aqueous solution containing same together with fission products by adjusting the concentration of the solution to approximately 0.5 M (aluminum) and the acidity to approximately pH 2. While maintaining the solution at the boiling point, approximately 0.01% iron, by weight, is added as a soluble ferric salt. After red, colloidal hydrous ferric oxide is formed, manganese, approximately 0.01%, by weight, is added to the solution as a soluble manganous salt and hydrous manganese dioxide precipitated by the slow addition of potassium permanganate to the resulting solution. The supernatant solution is then separated from the precipitate, the concentration of the supernatant solution adjusted to approximately 0.1 M in aluminum, and oxalic acid added until the solution is approximately 0.016 M in oxalic acid. This solution is then passed through a bed of Dowex-50 resin, mesh size approximately 80–100, at a flow rate of approximately 4 ml./min./cm.$^2$. Aluminum is then selectively eluted from the column with approximately 0.4 M aqueous oxalic acid at a flow rate of approximately 4 ml./min./cm.$^2$.

The following examples are offered to illustrate our invention in greater detail.

EXAMPLE 1

Approximately 0.7 liter of a 1.0 M $Al(NO_3)_3$ waste solution from a uranium solvent extraction process containing $3.6 \times 10^6$ c./m./ml. gross beta, $5.0 \times 10^3$ c./m./ml. gross gamma, and $8.1 \times 10^3$ c/m./ml. gross alpha was diluted to 0.5 M $Al(NO_3)_3$ by the addition of 0.7 liter $H_2O$ and the acidity adjusted to pH 2. The individual fission product contribution to the beta activity of the solution was as follows: Ru, 46%; Zr, 5.7%; Nb, 0.7%; Cs, 3.6%; Sr, 9.6%; and total rare earths 75.0%. The diluted solution was brought to boiling and 0.01% $Fe^{+3}$, by weight, was added as $Fe(NO_3)_3$, and after the formation of colloidal hydrous ferric oxide, 0.01% $Mn^{+2}$ as $Mn(NO_3)_2 \cdot 6H_2O$ and then drops of $KMnO_4$ until precipitation occurred. The supernatant solution was separated from the resulting precipitate by filtration. This scavenging achieved a gross beta decontamination factor of approximately 1–1.5 and a gross gamma decontamination factor of approximately 10. The filter cake was dissolved in a minimum of aqueous $HNO_3$—$H_2O_2$ (total volume only 1 ml.) and an analysis showed 97% of the total Ru, 99% of the total Zr and 90% of the total Nb, thus indicating excellent scavenging of the troublesome colloidal fission products.

The supernatant solution was then made 0.1 M in hydroxylamine and 0.1 M in $HNO_3$ and permitted to stand for 24 hours, thereby reducing the Pu present to $Pu^{+3}$. The resulting solution was then passed through a Dowex-50 resin column initially in $H^+$ form, 6 mm. in diameter and 106 cm. in height, until Pu first appeared in the filtrate. Approximately 99% of the original Al was recovered and a Pu decontamination factor of approximately 5000 was achieved.

The resulting solution was diluted to approximately 0.1 M Al by the addition of 5.6 liters $H_2O$, adjusted to approximately 0.016 M in oxalic acid to complex any remaining colloidal fission products, and then passed through a Dowex-50 resin column, 60–100 mesh, initially in $H^+$ form, 1.5 inches in diameter and 34 inches in height, at a flow rate of approximately 4 ml./min./cm.$^2$ The column was washed with 2.0 liters of 0.016 M oxalic acid to remove any remaining feed solution and the aluminum product was then eluted with 7.6 liters of 0.4 M oxalic acid at a flow rate of approximately 4 ml./min./cm.$^2$. The column was regenerated with 5.0 liters of 6 M $HNO_3$ and rinsed with 2.0 liters of de-ionized water. The combined liquid waste from the column operations, including the wash solution, the elutriant, and the regeneration solution comprised a volume of approximately 23 liters. After evaporation, the residue of hot liquids for storage comprised a volume of only approximately 14 ml., a volume reduction factor of the initial radioactive solution of approximately 50. The residue consisted of, in terms of original concentrations: Al, 1–3%; Pu, 0.02%; Cs, 99%; Ru, 3.0%; Zr, 0.4%; Nb, 10%; Sr and total rare earths, 99.99%.

The aluminum product eluate was evaporated to dryness, excess oxalic acid removed from the residue by sublimation, and the residue oxidized with 70% nitric acid to yield aluminum nitrate. The aluminum yield was 98% and the total beta and gamma decontmination factors were each $10^3$. The individual fission product decontaminations achieved were: Cs, $10^4$; Ru, $10^2$; Zr, $10^3$; Nb, $10^3$; and Sr and total rare earth, $10^4$.

EXAMPLE 2

This example is offered to particularly show the criticality of the scavenging to the overall decontamination process. The procedures, reagent concentrations, etc. of Example 1 were followed except that the scavenging step was omitted. The aluminum yield was 96%, but the beta and gamma decontamination factors were only 25 and 7, respectively. It can be immediately seen that these decontamination factors are much poorer than those obtained in Example 1.

EXAMPLES 3–7

Same as Example 1 except as indicated in Table I, below. The plutonium recovery step was omitted since the alpha count of the radioactively contaminated aluminum nitrate feed solution was only approximately $1 \times 10^3$ counts/min./ml. Table I, following, shows various process conditions and the gross and individual decontamination factors obtained.

*Table I*

| Ex. | Al in feed (mg.) | Complexing agent in feed | Wash solution | Al lost in wash (Percent) | Conc. of oxalic acid in elutriant | Decontamination factors | | | | | | | | | | |
|---|---|---|---|---|---|---|---|---|---|---|---|---|---|---|---|---|
| | | | | | | Gross | | | | | Individual decontamination factors | | | | | |
| | | | | | | Resin column | | Overall | | | Zr | Ru | Cs | Sr | Nb | Total rare earths |
| | | | | | | β | γ | Pu γ | β | γ | | | | | | |
| 3 | 1×578 | 0.016 M oxalic acid | 60 ml $H_2O$ | 1.0 | 0.4 M pH 0.78 | 174 | 15.5 | 1.0 | 278 | 118 | 426 | 143 | 16.8 | 5.2×10$^3$ | 98 | 8.4×10$^3$ |
| 4 | 0.2×578 | ___do___ | ___do___ | 1.6 | ___do___ | 270 | 20 | 1.6 | 432 | 152 | | 130 | 150 | | 10.7 | |
| 5 | 0.2×578 | ___do___ | ___do___ | 1.5 | ___do___ | 850 | 46 | 1.4 | 1.4×10$^3$ | 350 | 1.5×10$^3$ | 293 | 1.2×10$^3$ | 6.3×10$^3$ | 117 | 5.0×10$^4$ |
| 6 | 0.9×578 | ___do___ | 45 ml 0.016 M oxalic acid | 0.1 | ___do___ | 2.0×10$^3$ | 192 | 1.4 | 3.3×10$^3$ | 1.5×10$^3$ | 1.8×10$^3$ | 377 | 2.5×10$^4$ | 6.3×10$^4$ | 2.4×10$^3$ | 3.6×10$^4$ |
| 7 | 0.9×578 | ___do___ | ___do___ | 0.5 | 0.72 M pH 0.78 | 1.4×10$^3$ | 155.3 | 1.3 | 2.2×10$^3$ | 1.2×10$^3$ | 1.5×10$^3$ | 293 | 1.2×10$^3$ | 6.3×10$^3$ | 117 | 5.0×10$^4$ |

In the scavenging average gamma decontamination factors of 7.6 and average beta decontamination factor of 1.6 were obtained. Although these decontamination factors were relatively low, this step was, nonetheless, indispensable in achieving the excellent results in the following ion-exchange step. Thus, final aluminum yields of approximately 97%–99% and extremely high decontamination factors (i.e., up to approximately $10^3$ for beta and for gamma) were obtained.

It should be understood that the above examples are merely illustrative and should not be construed as limiting the scope of our invention. Although our invention has been specifically illustrated with respect to aluminum nitrate waste solutions from uranium solvent extraction processes, it may be suitably applied to contaminated aluminum obtained from other sources. For example, aluminum is commonly employed as jacketing material for neutronic bombardment targets. After bombardment, the contaminated aluminum jacket may be separated from the encased target material by chemical dissolution with either aqueous $NaOH$—$NaNO_3$ or with aqueous $HNO_3$ over an $Hg^{++}$ catalyst, as the first step in the processing of the bombarded material. The aluminum may then be satisfactorily recovered from the resulting solution by our process. Our invention should, therefore, be limited only as is indicated by the appended claims.

Having thus described our invention, we claim the following:

1. A process for the recovery and decontamination of aluminum from an acidic aqueous solution containing same and fission products in ionic form, which comprises contacting said solution with a mixture of comminuted $Fe_2O_3$ and $MnO_2$ in the amount of at least approximately 0.007% by weight each of iron and manganese, while maintaining said solution at a pH of approximately 1–4, separating the resulting aluminum-containing supernatant solution from the resulting precipitate, contacting the separated supernatant solution with a comminuted organic cation exchange resin, separating the resulting supernatant solution from the resulting aluminum-containing resin and selectively eluting and recovering said aluminum from the separated resin with an aqueous elutriant.

2. A process for the recovery and decontamination of aluminum from an acidic aqueous solution containing same and fission products in ionic form, which comprises precipitating ferric oxide and manganese dioxide in said solution in the amount of at least approximately 0.007% by weight each of iron and manganese, while maintaining said solution at a pH of approximately 1–4, separating the resulting aluminum-containing supernatant solution from the resulting high gamma activity-content precipitate, passing the separated supernatant solution through a bed of a comminuted organic cation exchange resin characterized by a plurality of —$CH_2SO_3H$ groups, and selectively eluting and collecting the resulting adsorbed aluminum from said bed with a solvent selected from the group consisting of aqueous $HNO_3$, $H_2SO_4$, inorganic halides and aqueous polycarboxylic acids.

3. A process for the recovery of aluminum from an acidic aqueous solution containing same and fission products in ionic form, which comprises adjusting the concentration of said solution to approximately 0.25–1 M in aluminum and the acidity to approximately pH 1–4, adding to the resulting solution, while maintaining same at the boiling point, approximately 0.01%–0.1%, by weight, of iron as a soluble ferric salt, and then approximately 0.01%–0.1% of manganese as a manganous salt, followed by an oxidizing reagent until precipitation occurs, separating the resulting aluminum-containing supernatant solution from the resulting high gamma activity-content precipitate, adjusting the concentration of the separated supernatant solution to approximately 0.05–0.2 M in aluminum and approximately 0.008 M–0.04 M in oxalic acid, passing the resulting solution through a bed of a comminuted organic cation exchange resin characterized by a plurality of —$CH_2SO_3H$ groups and selectively eluting and collecting the resulting adsorbed aluminum from said bed with an aqueous polycarboxylic acid.

4. The method of claim 3 wherein the aqueous polycarboxylic acid is oxalic acid.

5. The method of claim 3 wherein the aqueous polycarboxylic acid is approximately 0.1 M–1 M oxalic acid.

6. The method of claim 3 wherein the organic cation exchange resin is a sulfonated phenolic resin.

7. The method of claim 3 wherein the organic cation exchange resin is a sulfonated polystyrene resin.

8. The method of claim 3 wherein the soluble ferric and manganous salts are the nitrate salts and the oxidizing reagent is an alkali permanganate.

9. A process for the recovery and decontamination of aluminum from an acidic aqueous solution containing same and fission products in ionic form which comprises adjusting the concentration of said solution to approximately 0.5 M in aluminum and the acidity to approximately pH 2, adding to the resulting solution, while maintaining same at the boiling point, approximately 0.01% iron, by weight, as ferric nitrate, and upon the resulting formation of red colloidal hydrous ferric oxide, approximately 0.01% manganese, by weight, as manganous nitrate followed by the addition of $KMnO_4$ until precipitation occurs, separating the resulting aluminum-containing supernatant solution from the resulting high gamma activity-content precipitate, adjusting the concentration of the separated supernatant solution to approximately 0.1 M in aluminum, and approximately 0.016 M in oxalic acid, passing the resulting solution through a bed of a 60–100 mesh sulfonated polystyrene resin at a flow rate of approximately 1–10 ml./min./cm.$^2$, selectively eluting and collecting the resulting adsorbed aluminum from said bed with approximately 0.4 M aqueous oxalic acid at a flow rate of approximately 1–10 ml./min./cm.$^2$.

10. A process for the recovery and decontamination of aluminum from an acidic aqueous solution containing same together with fission products in ionic form and plutonium, which comprises precipitating a mixture of hydrous metal oxides in said solution in the amount of at least approximately 0.007% by weight of each metal, while maintaining said solution at a pH of approximately 1–4, separating the resulting plutonium and aluminum-containing supernatant solution from the resulting high gamma activity-content precipitate, adjusting the concentration of the separated supernatant solution to approximately 0.1 M in $HNO_3$, reducing said plutonium to a valence state of +3, passing the resulting plutonium-reduced solution through a bed of a comminuted organic cation exchange resin characterized by a plurality of —$CH_2SO_3H$ groups until plutonium first appears in the resulting filtrate, passing said filtrate through a second bed of the first named resin and selectively eluting and collecting the resulting adsorbed aluminum from said bed.

11. A process for the recovery and decontamination of aluminum from an acidic aqueous solution containing same together with fission products in ionic form and plutonium, which comprises precipitating $Fe_2O_3$ and $MnO_2$ in said solution in the amount of at least approximately 0.007% by weight each of iron and manganese, while maintaining said solution at a pH of approximately 1–4, separating the resulting plutonium and aluminum-containing supernatant solution from the resulting high gamma activity-content precipitate, adjusting the concentration of the separated supernatant solution to approximately 0.05 M–0.2 M in $HNO_3$, and approximately 0.05–0.2 M in a reducing reagent selected from the group consisting of hydroxylamine, ferrous sulfamate, hydrazine and relatively low molecular weight organic ketones and aldehydes, permitting the resulting solution to stand until plutonium is reduced to $Pu^{+3}$, passing the resulting plutonium-reduced solution through a bed of a comminuted organic cation exchange resin characterized by a plurality of —$CH_2SO_3H$ groups until plutonium first appears in the filtrate, passing said filtrate through a second bed of bed of the first named resin, and selectively eluting and collecting the resulting adsorbed aluminum from said bed with an aqueous elutriant selected from the group consisting of $HNO_3$, $H_2SO_4$, inorganic halides and aqueous polycarboxylic acids.

12. A process for the recovery and decontamination of aluminum from an acidic aqueous solution containing same together with fission products in ionic form and plutonium, which comprises adjusting the concentration of said solution to approximately 0.25–1.0 M in aluminum, the acidity to approximately pH 1–4, adding, while maintaining the resulting solution at the boiling point, approximately 0.01%, by weight, of iron as a soluble ferric salt, and then approximately 0.01%, by weight, of manganese as a manganous salt, followed by $KMnO_4$ until precipitation occurs, separating the resulting plutonium and aluminum-containing supernatant solution from the resulting high gamma activity-content precipitate, adjusting the concentration of the separated supernatant solution to approximately 0.1 M in $HNO_3$ and approximately 0.1 M in hydroxylamine, permitting the resulting solution to stand until plutonium is reduced to $Pu^{+3}$, passing the resulting plutonium-reduced solution through a bed of a comminuted organic cation exchange resin characterized by a plurality of —$CH_2SO_3H$ groups until plutonium first appears in the filtrate, adjusting the concentration of said filtrate to approximately 0.05–0.2

M in aluminum and approximately 0.01–0.02 M in oxalic acid, passing the resulting adjusted solution through a second bed of the first named resin at a flow rate of approximately 1–10 ml./min./cm.$^2$, selectively eluting and collecting the resulting adsorbed aluminum from said bed with approximately 0.1 M–1.0 M of aqueous oxalic acid at a flow rate of approximately 1–10 ml./min./cm.$^2$.

References Cited in the file of this patent

Freundlich: Colloid and Capillary Chemistry, translated from 3rd German Ed. by Hatfield, pages 220–222. Published by E. P. Dutton and Co., Inc., New York (1922).

Coryell et al.: Radiochemical Studies—The Fission Products, NNES IV–9, Book 1, McGraw-Hill Book Co. (1951), pp. 170–175.

Kakihana, J. Chem. Soc., Japan, vol. 71 (1950), p. 481 (abstracted in Chem. Abstracts, vol. 45 (1951); col. 6125c).

ORNL–301 (Revised), "Separation of Fission Products From Aluminum Waste Solutions by Ion Exchange," by Blanco, Higgins and Kibbey, period covered September 1947–September 1948, issued August 14, 1956.

The Condensed Chemical Dictionary, 5th Edition, Reinhold Publ. Corp. (1956), page 576.